US008483988B2

(12) United States Patent
Muramatsu et al.

(10) Patent No.: US 8,483,988 B2
(45) Date of Patent: Jul. 9, 2013

(54) TEMPERATURE ESTIMATION APPARATUS FOR AEROPLANE GAS TURBINE ENGINE

(75) Inventors: Hironori Muramatsu, Wako (JP); Tomohisa Saita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 277 days.

(21) Appl. No.: 12/892,012

(22) Filed: Sep. 28, 2010

(65) Prior Publication Data

US 2011/0077895 A1 Mar. 31, 2011

(30) Foreign Application Priority Data

Sep. 29, 2009 (JP) ................................. 2009-225293

(51) Int. Cl.
*G06F 19/00* (2011.01)
(52) U.S. Cl.
USPC .......................................... 702/130; 701/100
(58) Field of Classification Search
USPC .............. 702/130, 85; 701/99, 100, 101, 102, 701/103; 73/1.37
See application file for complete search history.

(56) References Cited

U.S. PATENT DOCUMENTS 7,826,954 B2 * 11/2010 Muramatsu et al. .......... 701/100
2011/0041510 A1 * 2/2011 Sasaki et al. .................... 60/776

FOREIGN PATENT DOCUMENTS

| JP | 02-037120 | 2/1990 |
| JP | 2001-329855 | 11/2001 |
| JP | 2002-106363 | 4/2002 |
| JP | 2002-106364 | 4/2002 |

OTHER PUBLICATIONS

Japanese Office Action, Japanese application No. JP 2009-225293, dated Mar. 27, 2013 with partial English translation, 3 pages.

* cited by examiner

*Primary Examiner* — Bryan Bui
(74) *Attorney, Agent, or Firm* — Rankin, Hill & Clark LLP

(57) ABSTRACT

In a temperature estimation apparatus for an aeroplane gas turbine engine mounted on an aircraft and having a combustion chamber, a high-pressure turbine rotated by combustion gas exhausted from the combustion chamber, a low-pressure turbine located downstream of the high-pressure turbine to be rotated by low-pressure gas which has passed through the high-pressure turbine, a high-pressure turbine rotational speed sensor, a low-pressure turbine rotational speed sensor, and a temperature sensor, inlet temperature at an inlet of the high-pressure turbine is estimated based on the detected outlet temperature of the low-pressure turbine and the rotational speed of the low-pressure turbine and is corrected with the detected rotational speed of the high-pressure turbine.

12 Claims, 5 Drawing Sheets

TEMPERATURE ESTIMATION APPARATUS FOR AEROPLANE GAS TURBINE ENGINE

BACKGROUND OF THE INVENTION

1. Field of the Invention

This invention relates to a temperature estimation apparatus for an aeroplane gas turbine engine.

2. Description of the Related Art

In an aeroplane gas turbine engine equipped with a high-pressure turbine rotated by high-pressure gas injected from a combustion chamber of the engine and with a low-pressure turbine located downstream of the high-pressure turbine and rotated by low-pressure gas passed therethrough, it is preferable to detect the temperature at an inlet of the high-pressure turbine for preventing the overheat of the engine. However, since the inlet temperature is extremely high so that it is impossible to directly detect it, it is configured to detect inlet temperature of the low-pressure turbine downstream of the high-pressure turbine and based thereon, estimate the inlet temperature of the high-pressure turbine.

However, since it is difficult to keep a space for a temperature sensor at or in the vicinity of the inlet of the low-pressure turbine of the aeroplane gas turbine engine which is required to be compact, the inlet temperature of the high-pressure turbine can not be estimated based on the inlet temperature of the low-pressure turbine.

To cope with it, a temperature sensor is installed near an outlet of the low-pressure turbine and based on the outlet temperature of the low-pressure turbine, the inlet temperature of the high-pressure turbine is estimated, as taught by, for example, Japanese Laid-Open Patent Application No. 2002-106364.

SUMMARY OF THE INVENTION

However, a technique disclosed in the reference only takes rotational speed of the low-pressure turbine into account to estimate the inlet temperature of the high-pressure turbine based on the outlet temperature of the low-pressure turbine and there is still room for improvement in terms of the estimation accuracy.

An object of this invention is therefore to overcome the foregoing problem by providing a temperature estimation apparatus for an aeroplane gas turbine engine that can accurately estimate inlet temperature of a high-pressure turbine based on outlet temperature of a low-pressure turbine.

In order to achieve the object, this invention provides in its first aspect an apparatus for estimating temperature for an aeroplane gas turbine engine mounted on an aircraft and having a combustion chamber, a high-pressure turbine rotated by combustion gas exhausted from the combustion chamber, and a low-pressure turbine located downstream of the high-pressure turbine to be rotated by low-pressure gas which has passed through the high-pressure turbine, comprising: a high-pressure turbine rotational speed sensor that detects rotational speed of the high-pressure turbine; a low-pressure turbine rotational speed sensor that detects rotational speed of the low-pressure turbine; a temperature sensor that detects outlet temperature at an outlet of the low-pressure turbine; an estimator that estimates inlet temperature at an inlet of the high-pressure turbine based on the detected outlet temperature of the low-pressure turbine and the rotational speed of the low-pressure turbine; and a corrector that corrects the estimated inlet temperature of the high-pressure turbine with the detected rotational speed of the high-pressure turbine.

In order to achieve the object, this invention provides in its second aspect a method of estimating temperature for an aeroplane gas turbine engine mounted on an aircraft and having a combustion chamber, a high-pressure turbine rotated by combustion gas exhausted from the combustion chamber, and a low-pressure turbine located downstream of the high-pressure turbine to be rotated by low-pressure gas which has passed through the high-pressure turbine, comprising the steps of: detecting rotational speed of the high-pressure turbine; detecting rotational speed of the low-pressure turbine; detecting outlet temperature at an outlet of the low-pressure turbine; estimating inlet temperature at an inlet of the high-pressure turbine based on the detected outlet temperature of the low-pressure turbine and the rotational speed of the low-pressure turbine; and correcting the estimated inlet temperature of the high-pressure turbine with the detected rotational speed of the high-pressure turbine.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A temperature estimation apparatus for an aeroplane gas turbine engine according to a preferred embodiment of the present invention will now be explained with reference to the attached drawings.

Figure 1:
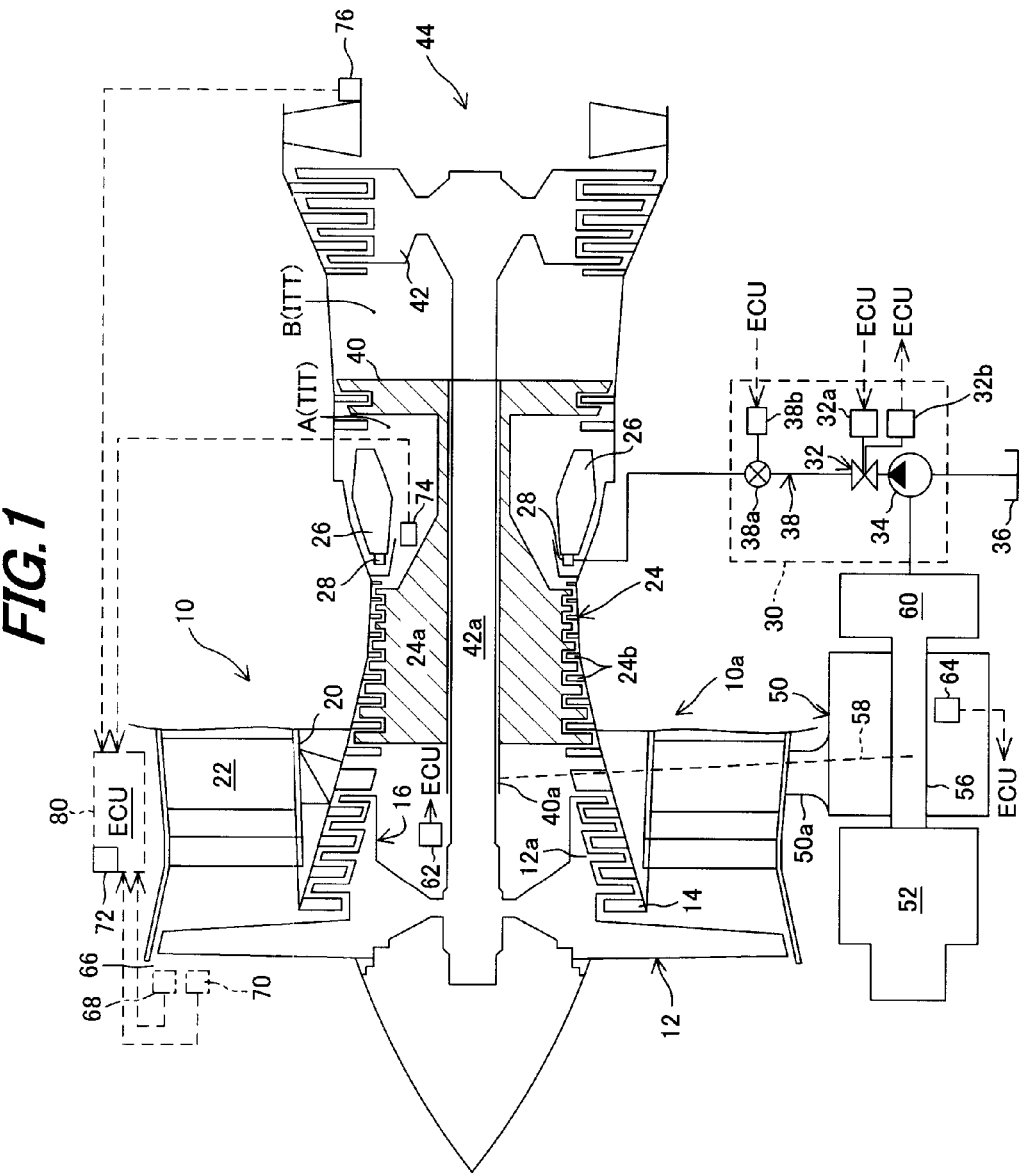
FIG. 1 is an overall schematic view of a temperature estimation apparatus for an aeroplane gas turbine engine according to an embodiment of this invention.

FIG. 1 is an overall schematic view of a temperature estimation apparatus for an aeroplane gas turbine engine according to an embodiment of this invention.

Four types of gas turbine engines, i.e., aeroplane gas turbine engines are commonly known: the turbojet engine, turbofan engine, turboprop engine and turboshaft engine. A two-shaft turbofan engine will be taken as an example in the following explanation.

In FIG. 1, reference numeral 10 designates a turbofan engine (gas turbine engine; hereinafter referred to as "engine"). Reference numeral 10a designates a main engine unit. The engine 10 is mounted at an appropriate location of an aircraft (airframe; not shown).

The engine 10 is equipped with a fan (fan blades) 12 that sucks in air while rotating rapidly. A rotor 12a is formed integrally with the fan 12. The rotor 12a and a stator 14 facing it together form a low-pressure compressor 16 that compresses the sucked-in air and pumps it rearward.

A duct or bypass 22 is formed in the vicinity of the fan 12 by a separator or splitter 20. Most of the air pulled in passes through the duct 22 to be jetted rearward of the engine 10 without being burned at a later stage (in the core). The force of the air accelerated rearward by the fan 12 produces a force of reaction that acts on the airframe (not shown), at which the engine 10 is mounted, as a propulsive force (thrust). Most of the propulsion is produced by the air flow from the fan.

The air compressed by the low-pressure compressor 16 flows rearward to a high-pressure compressor 24 where it is further compressed by a rotor 24a and stator 24b and then flows rearward to a combustion chamber 26.

The combustion chamber 26 is equipped with a fuel nozzle 28 that is supplied with pressurized fuel metered by an FCU (fuel control unit) 30. The FCU 30 is equipped with a fuel metering valve (FMV) 32. Fuel pumped by a fuel pump (gear pump) 34 from a fuel tank 36 located at an appropriate part of the airframe is metered or regulated by the fuel metering valve 32 and supplied to the fuel nozzle 28 through a fuel supply line 38.

The fuel metering valve 32 is connected to a torque motor 32a to be opened/closed thereby. Based on a command sent from an electronic control unit (ECU; explained later), the torque motor 32a operates the fuel metering valve 32 to open and close. The ECU outputs a command in accordance with a position of a thrust lever (not shown) manipulated by the pilot (operator). An opening sensor 32b is installed near the fuel metering valve 32 to detect the opening thereof.

A fuel shutoff valve (SOV) 38a is interposed in the fuel supply line 38. The fuel shutoff valve 38a is connected to an electromagnetic solenoid 38b to be opened/closed thereby. Based on a command sent from the ECU, the solenoid 38b operates the fuel shutoff valve 38a to open and close. Specifically, when a shutoff command is outputted, the fuel shutoff valve 38a is closed to shut off the fuel supply to the fuel nozzle 28. An opening sensor 38c is installed near the fuel shutoff valve 38a to detect the opening thereof.

The fuel nozzle 28 is supplied with compressed air from the high-pressure compressor 24 and sprays fuel supplied through the fuel supply line 38 using the compressed air.

The sprayed fuel from the fuel nozzle 28 is mixed with compressed air and the air-fuel mixture is burned after being ignited at engine starting by an ignition unit (not shown) having an exciter and a spark plug. Once the air-fuel mixture begins to burn, the air-fuel mixture composed of compressed air and fuel is continuously supplied and burned.

The hot high-pressure gas produced by the combustion is sent to a high-pressure turbine 40 to rotate it at high speed. The high-pressure turbine 40 is connected to the rotor 24a of the high-pressure compressor 24 through a high-pressure turbine shaft 40a to rotate the rotor 24a.

After driving the high-pressure turbine 40, the hot high-pressure gas is sent to a low-pressure turbine 42 (after passing through the high-pressure turbine 40, the gas becomes lower in pressure than gas sprayed from the combustion chamber 26) to rotate it at relatively low speed. The low-pressure turbine 42 is connected to the rotor 12a of the low-pressure compressor 16 through a low-pressure turbine shaft 42a. The rotor 12a and fan 12 are therefore also rotated. The high-pressure turbine shaft 40a and the low-pressure turbine shaft 42a are provided in a dual concentric structure.

The turbine exhaust gas passing through the low-pressure turbine 42 is mixed with the fan exhaust air passing through the duct 22 without compression or combustion and the combined flow is jetted rearward of the engine 10 through a jet nozzle 44.

An accessory drive gearbox (hereinafter referred to as "gearbox") 50 is attached to the undersurface at the front end of the main engine unit 10a through a stay 50a. An integrated starter/generator (hereinafter called "starter") 52 is attached to the front of the gearbox 50. The FCU 30 is located at the rear of the gearbox 50.

When the engine 10 is started, a starter 52 is operated to rotate a shaft 56 and the rotation thereof is transmitted through a drive shaft 58 (and a gear mechanism including a bevel gear etc. (not shown)) to the high-pressure turbine shaft 40a to generate compressed air. The compressed air is supplied to the fuel nozzle 28, as mentioned above.

The rotation of the shaft 56 is also transmitted to a PMA (permanent magnet alternator) 60 and the (high-pressure) fuel pump 34. The fuel pump 34 is therefore driven to pump and spray metered fuel from the fuel nozzle 28 as explained above. The resulting air-fuel mixture is ignited to start combustion.

When the engine 10 reaches self-sustaining operating speed, the rotation of the high-pressure turbine shaft 40a is transmitted back to the shaft 56 through the drive shaft 58 (and the gear mechanism including the bevel gear etc. (not shown)) to drive the fuel pump 34 and also drive the PMA 60 and starter 52. The PMA 60 therefore generates electricity and the starter 52 also generates electricity to be supplied to the airframe. When electrical load on the airframe side is increased, power generated by the starter 52 is increased and rotational load of the high-pressure turbine shaft 40a is increased, thereby affecting the high-pressure turbine rotational speed, which will be explained later.

An N1 sensor (speed sensor) 62 is installed near the low-pressure turbine shaft 42a of the engine 10 and generates an output or signal proportional to the rotational speed of the low-pressure turbine 42 (rotational speed of the low-pressure turbine shaft 42a) N1. An N2 sensor (speed sensor) 64 is installed near the shaft 56 and generates an output or signal proportional to the rotational speed of the high-pressure turbine 40 (rotational speed of the high-pressure turbine shaft 40a) N2.

A T1 sensor (temperature sensor) 68 and P1 sensor (pressure sensor) 70 are installed near an air intake 66 at the front of the main engine unit 10a and generate outputs or signals proportional to the temperature (ambient temperature of the aircraft) T1 and the pressure P1, respectively, of the inflowing air at that location. A P0 sensor (pressure sensor) 72 is installed inside the ECU explained below and generates an output or signal proportional to atmospheric pressure P0. Further, a temperature sensor (not shown) is installed inside the ECU (now designated by reference numeral 80) and generates an output or signal proportional to the temperature of the ECU 80.

Furthermore, a P3 sensor (pressure sensor) 74 is installed downstream of the rotor 24a and generates an output or signal proportional to the output pressure P3 (pressure at the outlet of the high-pressure compressor 24). An EGT sensor (temperature sensor) 76 is installed at an appropriate location downstream of the low-pressure turbine 42 and generates an output or signal proportional to the exhaust gas temperature EGT (low-pressure turbine outlet temperature).

Among the foregoing sensors, some sensors are configured to be redundant by having two electrical systems for safety.

The ECU 80 is housed in the main engine unit 10a at its upper location. The outputs of the foregoing sensors indicating the operating condition of the engine 10 are sent to the ECU 80. The ECU 80 calculates a Mach number Mn indicating flight speed of the aircraft based on a ratio of the atmospheric pressure P0 to the pressure P1, and the flight altitude ALT based on the atmospheric pressure P0.

Based on the outputs of the sensors and basic information (precisely, the low-pressure turbine outlet temperature EGT, low-pressure turbine rotational speed T1, high-pressure turbine rotational speed N2, flight altitude ALT, flight speed Mn and ambient temperature T1) of the aircraft calculated based on the sensor outputs, the ECU 80 calculates a TIT (turbine inlet temperature; inlet temperature of the high-pressure turbine 40; gas temperature at a point indicated by "A" in FIG. 1). The explanation on the calculating operation by the ECU 80 will be made in detail.

Figure 2:
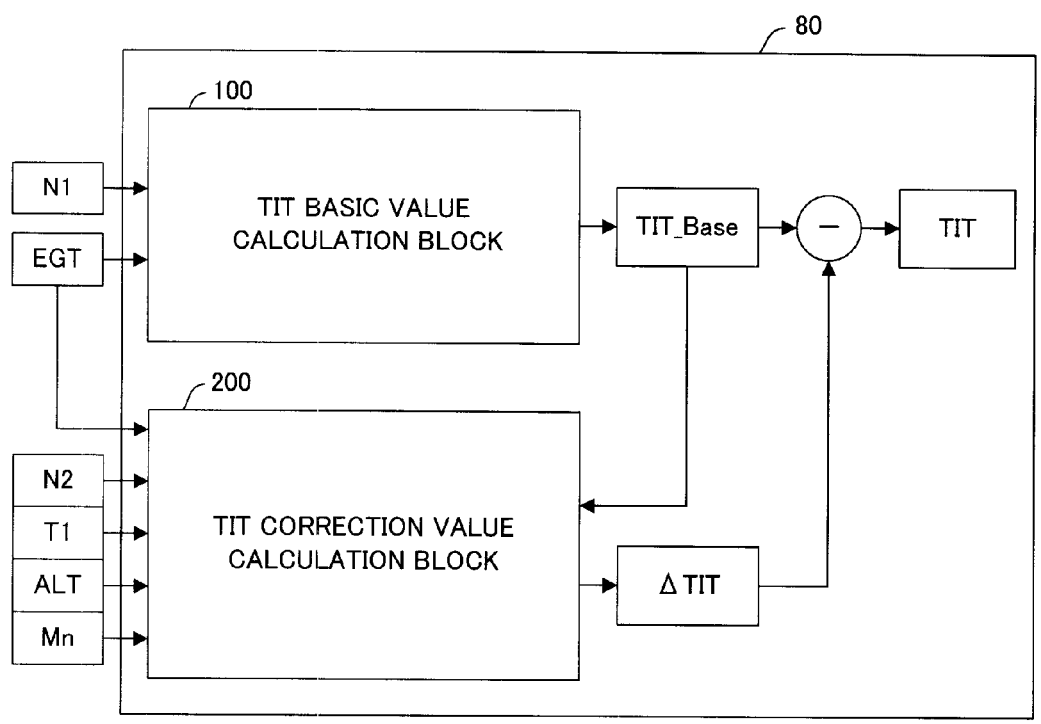
FIG. 2 is a block diagram for explaining the operation for calculating inlet temperature of a high-pressure turbine by an electronic control unit shown in FIG. 1.

FIG. 2 is a block diagram for explaining the operation for calculating the TIT by the ECU 80.

As shown, the detected low-pressure turbine rotational speed N1 and low-pressure turbine outlet temperature EGT are inputted to a TIT basic value calculation block 100 to calculate or estimate a TIT basic value TIT_Base. The high-pressure turbine rotational speed N2, ambient temperature T1, altitude ALT, flight speed Mn, EGT and TIT_Base are inputted to a TIT correction value calculation block 200 to calculate a TIT correction value ΔTIT. Then, the TIT correction value ΔTIT is subtracted from the TIT basic value TIT_Base for correction, thereby obtaining the TIT.

Estimation with TIT basic value TIT_Base will make it possible to estimate the TIT with a margin of error of plus or minus 20 to 30° C. or thereabout. However, in this embodiment, the TIT basic value TIT_Base is corrected with the TIT correction value ΔTIT for improving the estimation accuracy.

The TIT is calculated by the ECU 80 at predetermined intervals, e.g., 100 milliseconds.

In the case where the TIT correction value ΔTIT is greatly changed from the preceding value (due to a switch input of, e.g., BOV-Open/Close), a TIT change limiting block (not shown) is provided to limit the change and the TIT within a permissible range is determined as the final TIT. The determined TIT is displayed on a display at the cockpit of the aircraft, while being used for various types of control such as the engine control.

Figure 3:
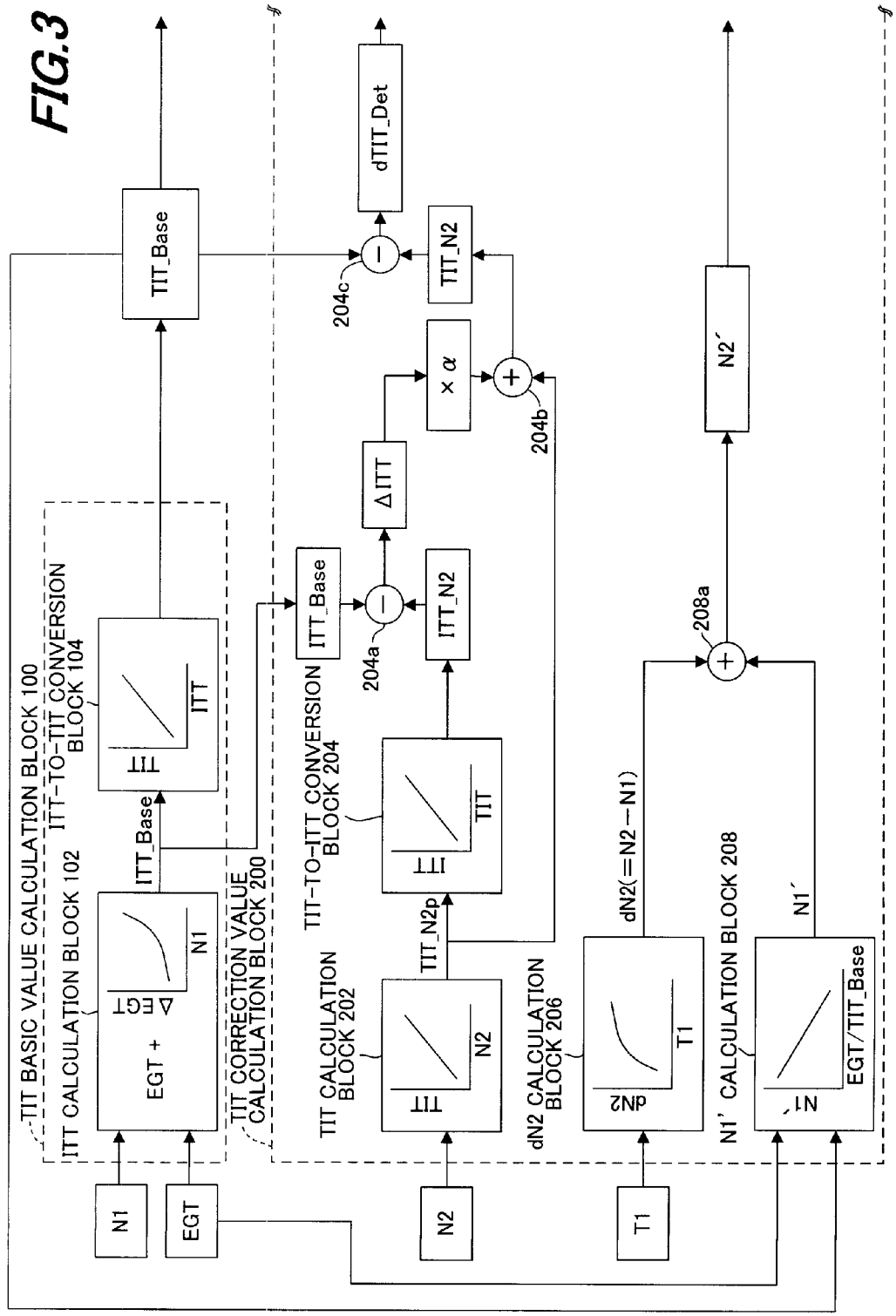
FIG. 3 is a block diagram for explaining details of a TIT basic value calculation block and a part of a TIT correction value calculation block shown in FIG. 2.

FIG. 3 is a block diagram for explaining details of the TIT basic value calculation block 100 and a part of the TIT correction value calculation block 200.

The low-pressure turbine rotational speed N1 and low-pressure turbine outlet temperature EGT are inputted to an ITT calculation block 102 of the TIT basic value calculation block 100 to calculate an ITT_Base. An ITT (intermediate turbine temperature) indicates gas temperature at a position (indicated by "B" in FIG. 1) between the high pressure turbine 40 and low-pressure turbine 42, and means the same as the inlet temperature of the low-pressure turbine 42 mentioned above. The ITT_Base is a value before being corrected.

The ITT_Base is obtained by calculating a temperature difference ΔEGT between the ITT and EGT and adding the difference ΔEGT to the EGT. The difference ΔEGT is obtained based on the low-pressure turbine rotational speed N1 by using a map (mapped data; characteristics; shown in the figure) prepared beforehand.

The calculated ITT_Base is sent to an ITT-to-TIT conversion block 104 where the ITT is converted to the TIT by using a map (characteristics; shown in the figure) prepared beforehand to calculate the foregoing TIT basic value TIT_Base.

On the other hand, the high-pressure turbine rotational speed N2 is inputted to a TIT calculation block 202 of the TIT correction value calculation block 200 to calculate a TIT_N2p based thereon by using a map (characteristics; shown in the figure) prepared beforehand. The TIT_N2p indicates provisional high-pressure turbine inlet temperature estimated based on the high-pressure turbine rotational speed N2.

A plurality of the maps are prepared in the TIT calculation block 202 and used to be retrieved in accordance with the flight speed Mn and altitude ALT in the flight envelope of the aircraft.

The calculated TIT_N2p is sent to a TIT-to-ITT conversion block 204 where the TIT is converted to the ITT by using a map (characteristics; shown in the figure) prepared beforehand to calculate an ITT_N2. The ITT_N2 indicates intermediate turbine temperature estimated based on the high-pressure turbine rotational speed N2.

Next, a TIT_N2 is obtained by calculating a temperature difference ΔITT between the ITT_Base calculated in the ITT calculation block 102 and the ITT_N2 calculated in the TIT-to-ITT conversion block 204, multiplying the difference ΔITT by a coefficient α(1.0<α<2.0) prepared as the map in the TIT-to-ITT conversion block 204, and adding the TIT_N2p calculated in the TIT calculation block 202 to the multiplication result. The TIT_N2 indicates high-pressure turbine inlet temperature estimated based on the high-pressure turbine rotational speed N2.

Next, a parameter dTIT_Det is calculated by subtracting the TIT_N2 from the TIT basic value TIT_Base calculated in the TIT basic value calculation block 100.

The dTIT_Det is a parameter indicating load and deterioration of the engine 10. Specifically, whereas the TIT_Base indicates a TIT value estimated based on the low-pressure turbine outlet temperature EGT which is the actually-detected value, the TIT_N2 indicates a TIT value estimated based on the high-pressure turbine rotational speed N2 and it means that the TIT_N2 is estimated based on an ideal model or state with no load and no deterioration of the engine 10. Hence, the dTIT_Det which is a difference between the TIT_Base and TIT_N2 functions as a parameter indicating degrees of load and deterioration of the engine 10.

Further, since the high-pressure turbine rotational speed N2 changes depending on the increase/decrease of engine load (especially, electrical load and air bleed load on the airframe side), the dTIT_Det also functions as a parameter indicating the electrical load and air bleed load.

Figure 4:
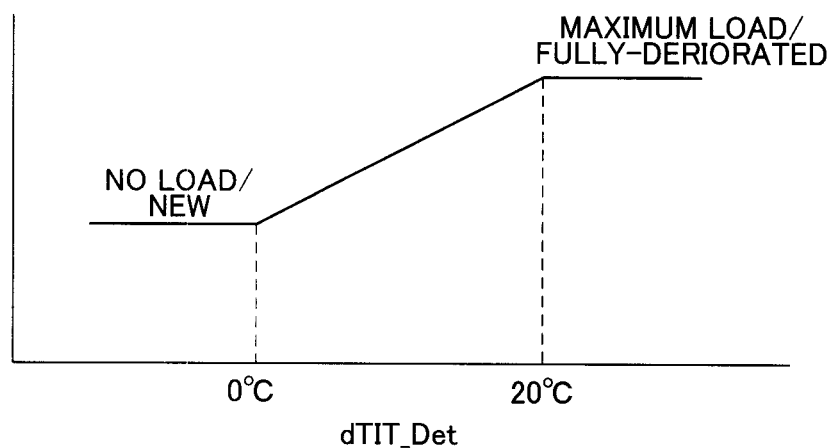
FIG. 4 is a graph for explaining the characteristics of a parameter dTIT_Det shown in FIG. 3.

FIG. 4 is a graph for explaining the characteristics of the dTIT_Det.

As shown, when the dTIT_Det is 0° C., it means that the engine 10 does not have load and is not deteriorated, i.e., is under no load and is also seemed to be new theoretically. In contrast, when the dTIT_Det is, for example, 20° C., the load and deterioration of the engine 10 estimated at their maximum levels, i.e., the engine 10 is estimated to be under maximum load and fully deteriorated.

Returning to the explanation on FIG. 3, the ambient temperature T1 is inputted to a dN2 calculation block 206 of the TIT correction value calculation block 200 to calculate a dN2 based thereon by using a map (characteristics; shown in the figure) prepared beforehand. The dN2 indicates a deviation between the high-pressure turbine rotational speed N2 and low-pressure turbine rotational speed N1, estimated based on the ambient temperature T1.

The low-pressure turbine outlet temperature EGT and TIT basic value TIT_Base are inputted to an N1' calculation block 208 of the TIT correction value calculation block 200. Based on a quotient obtained by dividing the EGT by the TIT_Base, an N1' is calculated by using a map (characteristic; shown in the figure) prepared beforehand. The N1' is the low-pressure turbine rotational speed estimated based on the EGT and TIT_Base.

Next, the calculated dN2 and N1' are summed up to obtain an N2'. The N2' indicates the high-pressure turbine rotational speed estimated based on the T1, EGT and TIT_Base.

Figure 5A:
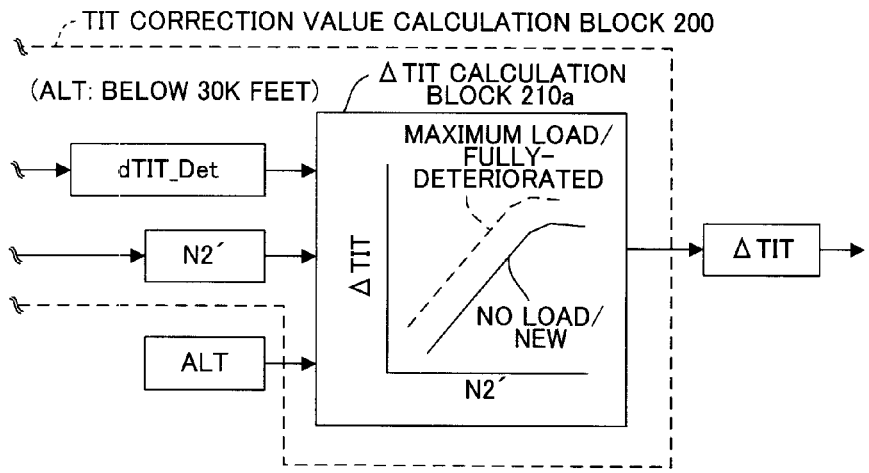
FIG. 5 is a set of block diagrams for explaining the remaining details of the TIT correction value calculation block shown in FIG. 2.
Figure 5B:
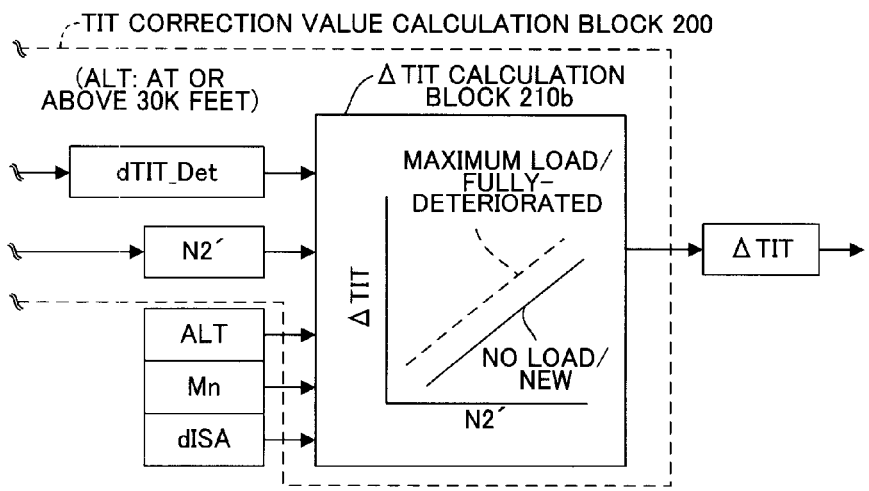

FIG. 5 is a set of block diagrams for explaining the remaining details of the TIT correction value calculation block. FIG. 5A is for the case of the altitude ALT below 30 kft (kilofeet; 9000 meters) and FIG. 5B is for the case of the altitude ALT at or above 30 kft.

When the altitude ALT is below 30 kft, as shown in FIG. 5A, the parameter dTIT_Det, estimated high-pressure turbine rotational speed N2' and altitude ALT are inputted to a ΔTIT calculation block 210a to calculate the aforementioned TIT correction value ΔTIT based on the N2' and dTIT_Det by using a map (characteristics; shown in the figure) prepared beforehand. In the map, although only two lines of the dTIT_Det (i.e., a line indicating that the engine 10 is under no load and new and a line indicating that the engine 10 is under maximum load and fully deteriorated) are shown, as for an intermediate value therebetween, it is calculated by interpolating with respect to the two lines to obtain the TIT correction value ΔTIT.

Further, a plurality of the maps, i.e., two maps are prepared in the ΔTIT calculation block 210a and used in accordance with the altitude ALT.

Thus, when the altitude ALT is below 30 kft, the TIT correction value ΔTIT is calculated based on the dTIT_Det, N2' and ALT.

When the altitude ALT is at or above 30 kft, as shown in FIG. 5B, in addition to the dTIT_Det, N2' and ALT, the flight speed Mn and a dISA are inputted to a ΔTIT calculation block 210b. The dISA is a temperature difference between standard ambient temperature specified by an ISA (International Standard Atmospheres) and static ambient temperature T0. The static ambient temperature T0 is calculated based on the ambient temperature T1, altitude ALT and flight speed Mn.

In the ΔTIT calculation block 210b, the TIT correction value ΔTIT is calculated based on the N2' and dTIT_Det by using a map (characteristics; shown in the figure) prepared beforehand. In the map, an intermediate value between two lines of the dTIT_Det can be calculated by interpolating with respect to the two lines, similarly to in the ΔTIT calculation block 210a.

Further, a plurality of the maps are prepared in the ΔTIT calculation block 210b and used in accordance with the altitude ALT, flight speed Mn and dISA. Specifically, two maps are prepared for the altitude ALT, seven maps for the flight speed Mn, and two maps for positive and negative values of the dISA.

Thus, when the altitude ALT is at or above 30 kirofeet, the TIT correction value ΔTIT is calculated based on the dTIT_Det, N2', ALT, Mn and dISA.

The TIT correction value ΔTIT calculated in the ΔTIT calculation block 210a or 210b is used to correct the TIT basic value TIT_Base through subtraction, thereby obtaining the TIT, as mentioned above.

As stated above, this embodiment is configured to have an apparatus for and a method of estimating temperature for an aeroplane gas turbine engine (10) mounted on an aircraft and having a combustion chamber (26), a high-pressure turbine (40) rotated by combustion gas exhausted from the combustion chamber, and a low-pressure turbine (42) located downstream of the high-pressure turbine to be rotated by low-pressure gas which has passed through the high-pressure turbine, comprising: a high-pressure turbine rotational speed sensor (N2 sensor 64) that detects rotational speed of the high-pressure turbine (N2); a low-pressure turbine rotational speed sensor (N1 sensor 62) that detects rotational speed of the low-pressure turbine (N1); a temperature sensor (EGT sensor 76) that detects outlet temperature at an outlet of the low-pressure turbine (exhaust gas temperature EGT); an estimator (ECU 80, TIT basic value calculation block 100) that estimates inlet temperature at an inlet of the high-pressure turbine (TIT basic value TIT_Base) based on the detected outlet temperature of the low-pressure turbine (EGT) and the rotational speed of the low-pressure turbine (N1); and a corrector (ECU 80, TIT correction value calculating block 200) that corrects the estimated inlet temperature of the high-pressure turbine (TIT_Base) with the detected rotational speed of the high-pressure turbine (N2).

With this, when estimating the inlet temperature of the high-pressure turbine 40 based on the outlet temperature EGT of the low pressure turbine 42, in addition to the low-pressure turbine rotational speed N1, the high-pressure turbine rotational speed N2 is also taken into account. With this, it becomes possible to enhance the estimation accuracy of the inlet temperature of the high-pressure turbine 42.

In the apparatus and method, the corrector includes: a second estimator (TIT calculation block 202, etc) that estimates second inlet temperature of the high-pressure turbine (TIT_N2p; TIT_N2) based on the detected rotational speed of the high-pressure turbine (N2); and a parameter calculator (subtracter 204c) that calculates a parameter (dTIT_Det) indicating degrees of load and deterioration of the engine based on the estimated inlet temperature and the estimated second inlet temperature of the high-pressure turbine, and corrects the estimated inlet temperature of the high-pressure turbine with the calculated parameter.

With this, since the inlet temperature of the high-pressure turbine 40 is estimated with taking degrees of load and deterioration of the engine 10 into account, it becomes possible to further enhance the estimation accuracy of the inlet temperature of the high-pressure turbine.

In the apparatus and method, the corrector further includes: an altitude detector (P0 sensor 72) that detects flight altitude of the aircraft (ALT); a speed detector (ECU 80) that detects flight speed of the aircraft (Mn); and an ambient temperature sensor (T1 sensor 68) that detects ambient temperature of the aircraft (T1), and corrects the estimated inlet temperature of the high-pressure turbine (TIT basic value TIT_Base) with the detected flight altitude, the flight speed and the ambient temperature.

In the apparatus and method, the parameter calculator (subtracter 204c) calculates the parameter by subtracting the second inlet temperature from the inlet temperature.

In the apparatus and method, the corrector corrects the estimated inlet temperature of the high-pressure turbine (TIT basic value TIT_Base) with the parameter (dTIT_Det), the rotational speed of the high-pressure turbine (N2), the ambient temperature (T1) and the flight altitude (ALT) when the flight altitude is below a predetermined altitude (30 kft).

In the apparatus and method, the corrector corrects the estimated inlet temperature of the high-pressure turbine is corrected with the parameter (dTIT_Det), the rotational speed of the high-pressure turbine, the ambient temperature, the flight altitude and the flight speed when the flight altitude is at or above the predetermined altitude.

With this, it becomes possible to still further enhance the estimation accuracy of the inlet temperature of the high-pressure turbine.

It should be noted that, although the altitude ALT, flight speed Mn and ambient temperature T1 are calculated based on the outputs of the sensors for the engine, sensors on the airframe side may be used so as to avoid the redundancy of the sensors.

Japanese Patent Application No. 2009-225293 filed on Sep. 29, 2009, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for estimating temperature for an aeroplane gas turbine engine mounted on an aircraft and having a combustion chamber, a high-pressure turbine rotated by combustion gas exhausted from the combustion chamber, and a low-pressure turbine located downstream of the high-pressure turbine to be rotated by low-pressure gas which has passed through the high-pressure turbine, comprising:
   a high-pressure turbine rotational speed sensor that detects rotational speed of the high-pressure turbine;
   a low-pressure turbine rotational speed sensor that detects rotational speed of the low-pressure turbine;
   a temperature sensor that detects outlet temperature at an outlet of the low-pressure turbine;
   an estimator that estimates inlet temperature at an inlet of the high-pressure turbine based on the detected outlet temperature of the low-pressure turbine and the rotational speed of the low-pressure turbine; and
   a corrector that corrects the estimated inlet temperature of the high-pressure turbine with the detected rotational speed of the high-pressure turbine.

2. The apparatus according to claim 1, wherein the corrector includes:
   a second estimator that estimates second inlet temperature of the high-pressure turbine based on the detected rotational speed of the high-pressure turbine; and
   a parameter calculator that calculates a parameter indicating degrees of load and deterioration of the engine based on the estimated inlet temperature and the estimated second inlet temperature of the high-pressure turbine,
   and corrects the estimated inlet temperature of the high-pressure turbine with the calculated parameter.

3. The apparatus according to claim 2, wherein the corrector further includes:
   an altitude detector that detects flight altitude of the aircraft;
   a speed detector that detects flight speed of the aircraft; and
   an ambient temperature sensor that detects ambient temperature of the aircraft,
   and corrects the estimated inlet temperature of the high-pressure turbine with the detected flight altitude, the flight speed and the ambient temperature.

4. The apparatus according to claim 2, wherein the parameter calculator calculates the parameter by subtracting the second inlet temperature from the inlet temperature.

5. The apparatus according to claim 3, wherein the corrector corrects the estimated inlet temperature of the high-pressure turbine with the parameter, the rotational speed of the high-pressure turbine, the ambient temperature and the flight altitude when the flight altitude is below a predetermined altitude.

6. The apparatus according to claim 5, wherein the corrector corrects the estimated inlet temperature of the high-pressure turbine is corrected with the parameter, the rotational speed of the high-pressure turbine, the ambient temperature, the flight altitude and the flight speed when the flight altitude is at or above the predetermined altitude.

7. A method of estimating temperature for an aeroplane gas turbine engine mounted on an aircraft and having a combustion chamber, a high-pressure turbine rotated by combustion gas exhausted from the combustion chamber, and a low-pressure turbine located downstream of the high-pressure turbine to be rotated by low-pressure gas which has passed through the high-pressure turbine, comprising the steps of:
   detecting rotational speed of the high-pressure turbine;
   detecting rotational speed of the low-pressure turbine;
   detecting outlet temperature at an outlet of the low-pressure turbine;
   estimating inlet temperature at an inlet of the high-pressure turbine based on the detected outlet temperature of the low-pressure turbine and the rotational speed of the low-pressure turbine; and
   correcting the estimated inlet temperature of the high-pressure turbine with the detected rotational speed of the high-pressure turbine.

8. The method according to claim 7, wherein the step of correction includes the steps of:
   estimating second inlet temperature of the high-pressure turbine based on the detected rotational speed of the high-pressure turbine; and
   calculating a parameter indicating degrees of load and deterioration of the engine based on the estimated inlet temperature and the estimated second inlet temperature of the high-pressure turbine,
   and corrects the estimated inlet temperature of the high-pressure turbine with the calculated parameter.

9. The method according to claim 8, wherein the step of correction further includes the steps of:
   detecting flight altitude of the aircraft;
   detecting flight speed of the aircraft; and
   detecting ambient temperature of the aircraft,
   and corrects the estimated inlet temperature of the high-pressure turbine with the detected flight altitude, the flight speed and the ambient temperature.

10. The method according to claim 8, wherein the step of parameter calculation calculates the parameter by subtracting the second inlet temperature from the inlet temperature.

11. The method according to claim 9, wherein the step of correction corrects the estimated inlet temperature of the high-pressure turbine with the parameter, the rotational speed of the high-pressure turbine, the ambient temperature and the flight altitude when the flight altitude is below a predetermined altitude.

12. The method according to claim 11, wherein the step of correction corrects the estimated inlet temperature of the high-pressure turbine is corrected with the parameter, the rotational speed of the high-pressure turbine, the ambient temperature, the flight altitude and the flight speed when the flight altitude is at or above the predetermined altitude.

* * * * *